US009942426B2

(12) United States Patent
Lea et al.

(10) Patent No.: US 9,942,426 B2
(45) Date of Patent: Apr. 10, 2018

(54) EDITING AN ELECTRONIC DOCUMENT ON A MULTIPURPOSE PERIPHERAL DEVICE

(71) Applicant: Hewlett-Packard Development Company, L. P., Houston, TX (US)

(72) Inventors: Perry V Lea, Eagle, ID (US); Brian James Sahr, Boise, ID (US); Steven Holland, Boise, ID (US); Eric P Christianson, Meridian, ID (US); John D Wilcox, Boise, ID (US); Bradley R Larson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/307,164

(22) PCT Filed: Apr. 29, 2014

(86) PCT No.: PCT/US2014/035902
§ 371 (c)(1),
(2) Date: Oct. 27, 2016

(87) PCT Pub. No.: WO2015/167463
PCT Pub. Date: Nov. 5, 2015

(65) Prior Publication Data
US 2017/0054857 A1      Feb. 23, 2017

(51) Int. Cl.
*G06F 3/12* (2006.01)
*H04N 1/00* (2006.01)
*H04N 1/387* (2006.01)

(52) U.S. Cl.
CPC ....... *H04N 1/0044* (2013.01); *H04N 1/00129* (2013.01); *H04N 1/00204* (2013.01); *H04N 1/00411* (2013.01); *H04N 1/387* (2013.01); *H04N 2201/0094* (2013.01)

(58) Field of Classification Search
CPC ............... H04N 1/387; H04N 1/00129; H04N 1/00411; H04N 1/0044; H04N 1/00204; H04N 2201/0094
USPC .......................................... 358/1.15
See application file for complete search history.

(56) References Cited

U.S. PATENT DOCUMENTS

| | | |
|---|---|---|
| 7,542,160 B2 | 6/2009 | Parry et al. |
| 7,639,409 B2 | 12/2009 | Bressler |
| 7,864,199 B2 | 1/2011 | Utsunomiya et al. |
| 7,911,626 B2 | 3/2011 | Ferlitsch |
| 2003/0025921 A1* | 2/2003 | Delean ............... G06T 3/00 358/1.2 |

(Continued)

OTHER PUBLICATIONS

Epson Expression Premium XP-610 (Web Page), Retrieved Mar. 18, 2014, 5 Pages, http://www.epson.com.au/shoponline/shop/BrowseProducts.asp?CatID=7.

(Continued)

*Primary Examiner* — Neil R McLean
(74) *Attorney, Agent, or Firm* — HP Inc. Patent Department

(57) ABSTRACT

A system comprising a multifunctional peripheral device comprising a processor and a display device, in which the display device presents to a user an electronic document, in which, with an editing module, the multifunctional peripheral device receives input indicating edits to be made to the electronic document, and in which the edits are saved as a separate image.

16 Claims, 3 Drawing Sheets

(56) References Cited

U.S. PATENT DOCUMENTS

| | | |
|---|---|---|
| 2004/0057064 A1 | 3/2004 | Stringham |
| 2007/0201101 A1 | 8/2007 | Corona et al. |
| 2007/0253020 A1* | 11/2007 | Hull .................. H04N 1/00408 |
| | | 358/1.15 |
| 2008/0005579 A1* | 1/2008 | Gaines .................... G06F 21/32 |
| | | 713/186 |
| 2010/0118327 A1 | 5/2010 | Caspar et al. |
| 2011/0058202 A1 | 3/2011 | St. Jacques, Jr. et al. |
| 2012/0229832 A1 | 9/2012 | Tsujimoto |
| 2013/0201515 A1 | 8/2013 | Daos et al. |
| 2013/0222836 A1* | 8/2013 | Kakegawa .............. G06F 21/55 |
| | | 358/1.14 |
| 2013/0239208 A1* | 9/2013 | Suominen ............... G06F 21/64 |
| | | 726/19 |

OTHER PUBLICATIONS

MX-5141N/4141N, (Web Page), 2 Pages, http://www.sharp-world.com/products/copier/products/mx_5141n_4141n/index.html.

* cited by examiner

EDITING AN ELECTRONIC DOCUMENT ON A MULTIPURPOSE PERIPHERAL DEVICE

BACKGROUND

Multifunctional peripheral device (MFP device) incorporates the functionality of a number of devices such as a printer, a fax machine and a scanner. The combination of these devices into one device allows users to go to a single source to print, fax copy, and scan materials. An MFP device allows a user to send information to the MPF device in order to print off the material, make copies of that material, and/or fax that material to another without having to make multiple trips from his or her seat or interface with more than a single device.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
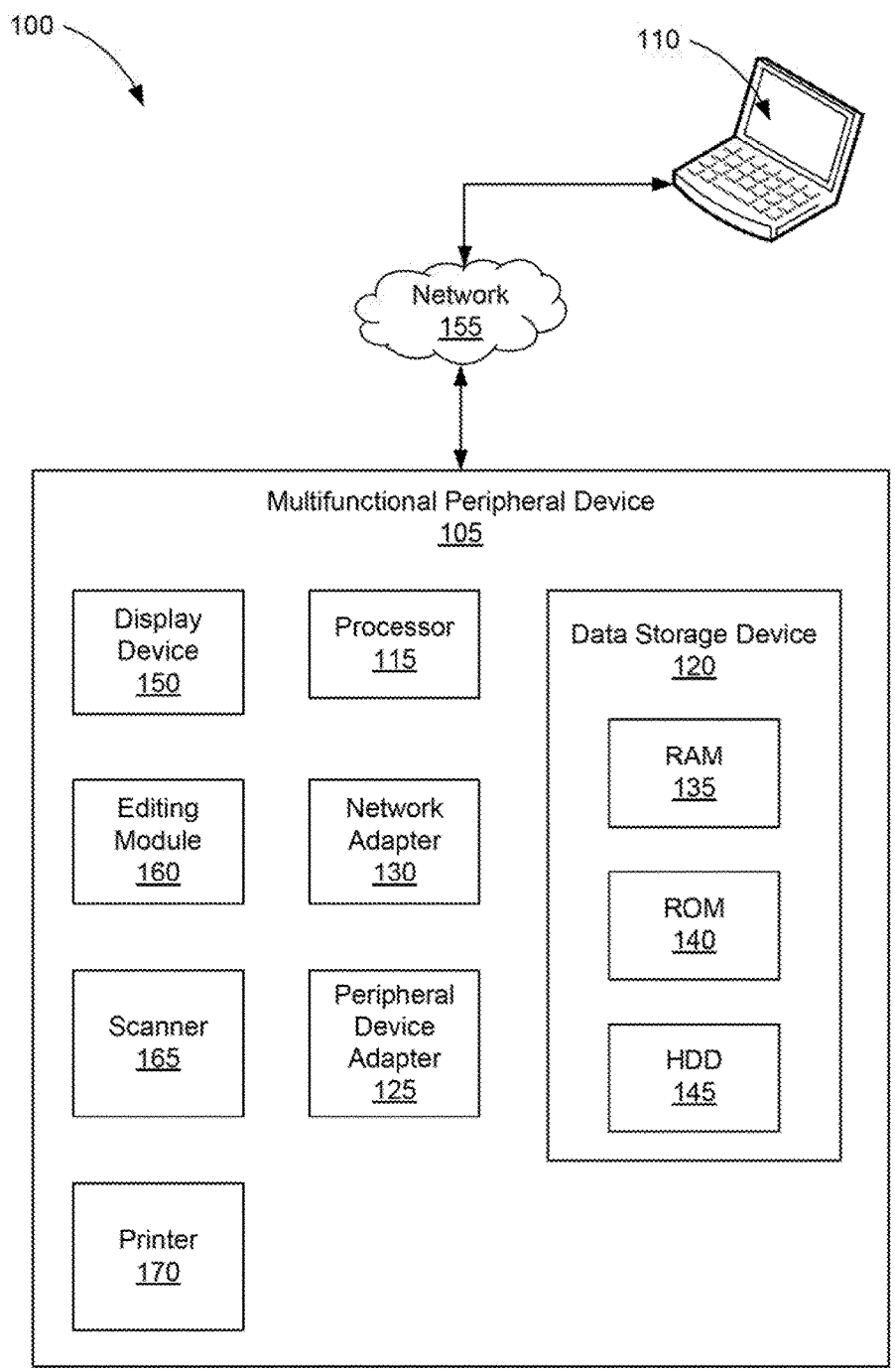
FIG. 1 is a block diagram of a system incorporating a multifunctional peripheral device (MFP device) for accepting edits, changes, or mark-ups to an electronic document according to one example of the principles described herein.

As described above, multifunctional peripheral devices (MFP devices) provide to a user the advantage of a "one-stop-shop" device where a user may make copies, scan documents, fax documents, and print off documents. Usually, the MFP device is the starting or ending point of a document workflow. With MFP devices the user is given limited ability to alter the documents scanned, faxed, or received by the MFP device. Where a user inputs a document to the MFP device, that document is printed off without the user being able to significantly alter the contents of the document including the text or images that appear on the documents. Further, a user may not be allowed to significantly alter a scanned document he or she has caused to be scanned by the MFP device. Even further, a user may not be allowed to alter the contents of a document that the user has attempted to fax.

The present specification, therefore, describes a system comprising a multifunctional peripheral device comprising a processor and a display device, in which the display device presents to a user an electronic document, in which, with an editing module, the multifunctional peripheral device receives input indicating edits to be made to the electronic document, and in which the edits are saved as a separate image surface. This separate image surface is different than the electronic document's original image surface.

The present specification further describes a method of receiving edits to an electronic document, comprising presenting an electronic document to a user via a display device of a multifunctional peripheral device, receiving edits to the electronic document, and storing the edits with the electronic document as a separate image surface. This separate image surface is different than the electronic document's original image surface.

Even further, the present specification describes a computer program product for receiving edits to an electronic document, the computer program product comprising a computer readable storage medium comprising computer usable program code embodied therewith, the computer usable program code comprising computer usable program code to, when executed by a processor, present an electronic document to a user via a display device of a multifunctional peripheral device, computer usable program code to, when executed by a processor, receive edits to the electronic document, and computer usable program code to, when executed by a processor, stores the edits with the electronic document as a separate image surface. This separate image surface is different than the electronic document's original image surface.

As used in the present specification and in the appended claims, the term "multifunctional peripheral device" is meant to be understood broadly as any physical hardware that combines two or more devices or functions into a single device. Consequently, the multifunctional peripheral device may comprise at least two of a printer, a scanner, a facsimile machine, a copier machine, an mailing device or combinations thereof. Multifunctional peripheral device (MFD) may also be known as multifunctional peripheral printers (MFP) or All-in-one (AiO) devices.

Additionally, as used in the present specification and in the appended claims, the term "electronic document" is meant to be understood broadly as any electronic media content that define the contents of a document, when printed onto a medium, a physical document.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of system (100) incorporating a multifunctional peripheral device (MFP device) (105) for accepting edits, changes, or mark-ups to an electronic document according to one example of the principles described herein. The system (100) may include an electronic device (110). Examples of electronic devices (110) include servers, desktop computers, laptop computers, personal digital assistants (PDAs), mobile devices, smartphones, gaming systems, and tablets, among other electronic devices.

To achieve its desired functionality, the MFP device (105) comprises various hardware components. Among these hardware components may be a number of processors (115), a number of data storage devices (120), a number of peripheral device adapters (125), and a number of network adapters (130). These hardware components may be interconnected through the use of a number of busses and/or network connections. In one example, the processor (115), data storage device (120), peripheral device adapters (125), and a network adapter (130) may be communicatively coupled via a common bus within the MFP device (105).

The processor (115) may include the hardware architecture to retrieve executable code from the data storage device (120) and execute the executable code. The executable code may, when executed by the processor (115), cause the processor (115) to implement at least the functionality of receiving edits, changes, or mark-ups to an electronic document according to the methods of the present specification described herein. In the course of executing code, the processor (115) may receive input from and provide output to a number of the remaining hardware units.

The data storage device (120) may store data such as executable program code that is executed by the processor (115) or other processing device. As will be discussed, the data storage device (120) may specifically store computer code representing a number of applications that the processor (115) executes to implement at least the functionality described herein.

The data storage device (120) may include various types of memory modules, including volatile and nonvolatile memory. For example, the data storage device (120) of the present example includes Random Access Memory (RAM) (135), Read Only Memory (ROM) (140), and Hard Disk Drive (HDD) memory (145). Many other types of memory may also be utilized, and the present specification contemplates the use of many varying type(s) of memory in the data storage device (120) as may suit a particular application of the principles described herein. In certain examples, different types of memory in the data storage device (120) may be used for different data storage needs. For example, in certain examples the processor (115) may boot from Read Only Memory (ROM) (140), maintain nonvolatile storage in the Hard Disk Drive (HDD) memory (145), and execute program code stored in Random Access Memory (RAM) (135).

Generally, the data storage device (120) may comprise a computer readable medium, a computer readable storage medium, or a non-transitory computer readable medium, among others. For example, the data storage device (120) may be, but not limited to, an electronic, magnetic, optical, electromagnetic, infra-red, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (125, 130) in the MFP device (105) enable the processor (115) to interface with various other hardware elements, external and internal to the MFP device (105). For example, the peripheral device adapters (125) may provide an interface to input/output devices, such as, for example, display device (150), a mouse, a keypad (FIG. 2, 210), or a keyboard. The peripheral device adapters (125) may also provide access to other external devices such as an external storage device, a number of network devices such as, for example, servers, switches, and routers, client devices, other types of computing devices, and combinations thereof.

The display device (150) may be provided to allow a user of the MFP device (105) to interact with and implement the functionality of the system (100). The peripheral device adapters (125) may also create an interface between the processor (115) and the display device (150), a printer (170), scanner (165), or other media input/output devices. The network adapter (130) may provide an interface to other computing devices within, for example, a network, thereby enabling the transmission of data between, for example, the electronic device (110) and the MFP device (105) as well as other devices couple to or located within the network (155).

The editing module (160) may, when executed by the processor (115), display the number of non-graphical and graphical user interfaces (GUIs) on the display device (150) associated with the executable program code representing the number of applications stored on the data storage device (120). The GUIs may include aspects of the executable code including presenting the electronic document to the user, graphically indicating accepted edits from the user, and providing various tools that may be used by the user to edit, change or mark-up the electronic document. The GUIs may display, for example, the electronic document sent to the MFP device (105) by a user. While accessing the electronic document, a portion of the graphical user interface (GUI) may further display various editing tools such as strikethrough, underline, bold, italicize, delete, insert table, insert page numbering, and insert bulleting, among others. Indeed, the GUI may include editing tools similar to those accessible to the user on an electronic device (110). In one example, the GUI may include editing tools similar to those accessible to a user of an electronic device (110) running MICROSOFT WORD. MICROSOFT WORD is a word processing computer program sold by the Microsoft Corporation located at Redmond Wash. As mentioned above, the display device (150) may be a display device (FIG. 2, 205) such as that shown in FIG. 2. Further examples of display devices (150) include a computer screen, a laptop screen, a mobile device screen, a personal digital assistant (PDA) screen, and a tablet screen, each communicatively coupled to the MFP device (105). Examples of, the GUIs displayed on the display device (150), will be described in more detail below.

The MFP device (105) further comprises a number of modules used in the implementation of the system (100). The various modules within the MFP device (105) comprise executable program code that may be executed separately. In this example, the various modules may be stored as separate computer program products. In another example, the various modules within the MFP device (105) may be combined within a number of computer program products; each computer program product comprising a number of the modules.

Figure 2:
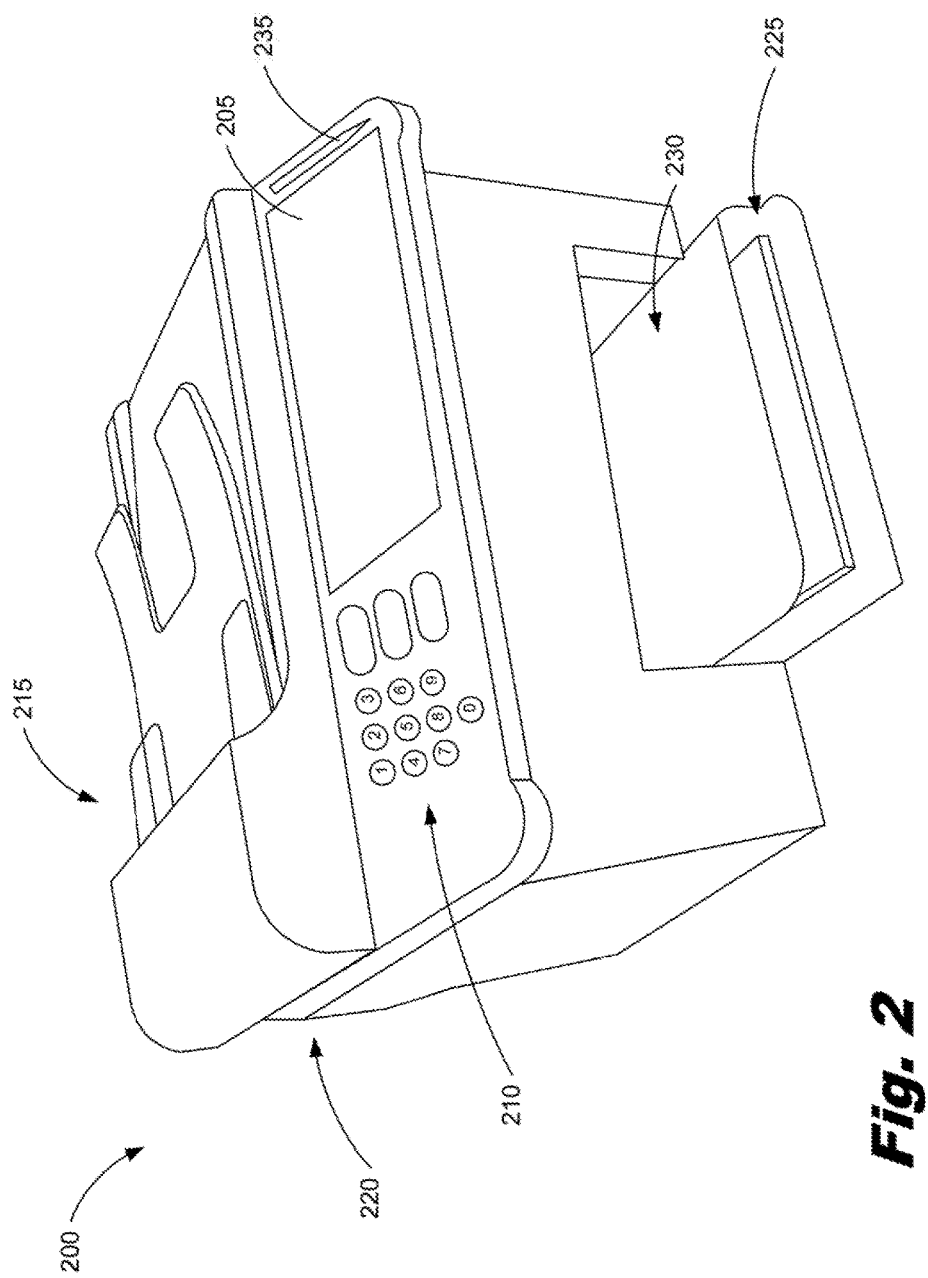
FIG. 2 is a diagram of a multifunctional peripheral device according to one example of the principles described herein.

FIG. 2 is a diagram of a multifunctional peripheral device (MFP device) (200) according to one example of the principles described herein. As discussed above, the MFP device may comprise a display device (205) and a keypad (210). The display device (205) allows the user to interface with the MFP device (200). The display device (205) may be any device that allows a user of the MFP device (200) to view and edit an electronic document. Examples of an MFP device (105) comprise, a liquid crystal display (LCD), a cathode ray tube (CRT), a plasma panel, an electroluminescent panel, a light-emitting diode (LED) display, among others. In one example, the display device (205) may be an 800×600 resolution 8 inch display. In another example, the display device (205) is a multi-touch input device such as an infra-red multi-touch panel.

The MFP device (200) may further include a keypad (210). The keypad (210) allows a user to hard-key in a number of letters and numbers so as to, for example, input a fax number. The MFP device (200) may, therefore, be communicatively coupled to a telephone system in order to fax the electronic documents to others.

The MFP device (200) further comprises those features that allow the user to scan, copy, and print the electronic document after the user has made edits to the electronic document. For example, the MFP device (200) may comprise a scanner (215). The scanner (215) may comprise a feed slot into which a user may insert a printed document and have the physical page scanned and converted into an electronic document. This electronic document may then be viewed and edited by the user via the display device (205) as described herein.

The MFP device (200) may further comprise a copier (220). The copier (220) may be a glass plane that is accessed by lifting a portion of the MFP device (200) that comprises the feed slot of the scanner (215). In one example, the charge-couple device used to scan a document with the scanner (215) may be similarly used to copy a document placed on the glass plane. Similar to above, the copied document may also be converted into an electronic document may be edited by the user via the display device (205) as described herein.

The MFP device (200) may further comprise a media supply unit (225) and a printed document discharge (230). The media supply unit (225) may provide a supply of, for example, paper to the MFP device (200) so that hard copies of an electronic document may be produced. The document discharge (230) may be a platform on which printed documents emerge from the MFP device (200) after the user has caused those documents to be printed.

During operation of the MFP device (200), a user may access an electronic document via the display device (205) and edit it using a number of gestures. These gestures may be accomplished by the user touching the multi-touch screen of the display device (205) or using a stylus (235) associated with the MFP device (200). These gestures will now be described in more detail.

As briefly described above, the electronic document may be obtained by the MFP device (200) by either sending an electronic document from the electronic device (FIG. 1, 110) or by scanning or copying a hard copy of a document. In one example, if the electronic document is obtained from scanning or copying the hard document, the MFP device (200) may first convert the scanned text and images on the document into an editable format. For example, the text on the hard copy may be recognized optically by the MFP device (200) using optical character recognition. Additionally, images may be detected and copied and pasted in the electronic document for the user to later manipulate or edit.

The scanned image may have a number of marks added to it such as redactions, highlights, insertion of geometric shapes, addition of text, subtraction of images or text, and pasting of additional text or images. The scanned page may be held in a preview mode for the user to view on the display device (205). Along with the displayed scanned page, a menu comprised of the available editing options may also be provided on the display device (205). Scripted and variable objects such as page numbers and timestamps may also be made to be selectable and the user may be allowed to manipulate those objects. Any edits made to the electronic document may be saved on the MFP device (200) as a separate image surface or layer. These surfaces can be manipulated independently and will remain separate electronically and may be combined into a single image at a point in the process when the document is physically printed by the printer (FIG. 1, 170). Separating the scanned image or its optically recognized images and text from the edits made by the user allows the user to relatively quickly preview and be able to unmark or undo a mark applied to the electronic document. The ability to undo a mark is accomplished by providing the user with an "undo" button on the display device (205). Similarly, a "redo" button may be provided to the user via the display device (205) such that the user may "redo" an edit once done to the electronic document and subsequently undone by the user.

A firmware database may be created on the data storage device (FIG. 1, 120) to store the new surfaces created by the edits the user has made to the scanned electronic document or the electronic document. Each page of the electronic document may, therefore, have an editing surface associated with it and each page may be stored on the data storage device (FIG. 1, 120). When the electronic document is digitally sent, stored, printed, or faxed, the electronic document will contain this new information defining the new image treatments on top of the original electronic documents.

When a user chooses to scan a hard document and create an electronic document therefrom, the content that was scanned can be clipped and cut according to the user's interactions with the display device (205) as described above and herein. In one example, a user may select a "cut" option from the menu described above. Accordingly, the user may draw a bounding box around a selection of the text or images on the electronic document. This may be done by the user touching the display device (205) with his or her finger, or with the stylus (235). In the example where the user uses his or her finger to create the bounding box around the selected text or images, a plurality of fingers may be used thereby allowing the user to interact relatively easier with the display device (205) and the electronic document.

In an alternative example, the user may select a portion of the text or images on the electronic device as described above without first selecting the "cut" option in the menu. In this case, the system (FIG. 1, 100) may pull up a floating menu on the display device (205) with a "cut" or "copy" option presented to the user for selection. Additional choices may be presented to the user on the floating menu such as text editing tools and image editing tools.

In other examples, the user may be presented with or cause to be presented with a blank surface onto which the user may add text or images to the blank surface. In this example, the user may be allowed to add blank pages to an existing electronic document or create a blank page without the MFP device (200) uploading an electronic document. Once the user is finished completing the edits to the blank pages, the user, through selection of a "save" option on the menu, may save the electronic document to the data storage device (FIG. 1, 120). In another example, the save operations may be automatically performed by the MFP device (200). In one example, the saved electronic document may be stored in the data storage device (FIG. 1, 120) as a compressed image. In another example, the MFP device (200) may save the electronic document in an encrypted format. In a yet further example, the MFP device (200), through the display device (205), may inquire as to whether the marks that were saved on a blank page should be added to all or selective pages as an alpha-blended treatment. In one example, the alpha-blending treatment is used as a watermark for the rest of the pages in the electronic document or saved as a specific watermark for later use in other electronic documents stored in the MFP device (200). In some examples, the watermark may include identification information regarding the author (i.e. the user) the date of creation, and whether the electronic document is to be privileged information or is a draft, among other indicators.

The electronic document and the various menu options shown on the display device (205) may further be manipulated using gesture based content manipulation. In one example, the gesture based manipulation involves hand gestures to manipulate content of a job in a preview mode. The preview mode may be a mode of the MFP device (200) wherein the MFP device (200) displays an electronic document in a preview as a number of thumbnails on the display device (205). In one example, a gesture based content manipulation involves the user selecting a thumbnail indicative of a page of the electronic document with a finger and dragging the thumbnail to another location or position on the screen. Moving it to another location allows a user to rearrange the order of the pages of the electronic document. Once the user releases his or her finger or the stylus (235) from the surface of the display device (205), the page may be placed in the order indicated by the move. In another example, the user may select and drag a page to a "trash can" icon placed on the display device (205) so as to delete the page drug over to the "trash can" icon by the user.

In another example, the gesture based content manipulation may allow a user to delete a number of pages within the electronic document. For example, a selection of a thumbnail image and a swipe with the user's finger or the stylus (235) from left-to-right or right-to-left may cause the selected page to be deleted. In this example, a window confirming the deletion of the page may appear on the display device (205) to request from the user a confirmation that he or she does, indeed, intend for the page to be deleted.

In another example, a press of a finger or stylus (235) on any individual thumbnail may present a pop-up menu for the user to select a number of options to view or adjust the image. These options may include a zooming or panning adjustment tool, a brightness and/or contrast adjustment tool, a page rotation tool, and a page mirroring tool, among others.

In another example, the individual thumbnails in the preview may be rotated or altered using a plurality of fingers. In this example, two fingers may be used to rotate the individual thumbnails representing the pages of the electronic document from a portrait view to a landscape view or visa-versa. Additionally, the pages may be rotated by any varying degree such that the scanned image appears aligned with the borders of the thumbnail thereby assuring a printed hard copy of the document will have text and/or images properly aligned for viewing.

The MFP device (200) further allows for secure information such as a signature to be placed on the electronic document. In this example, a signature of the user may be encrypted and securely stored on the data storage device (FIG. 1, 120). The signature may be retrieved later for use by a user. In one example the user may provide verification information that allows the user to securely access the signature. Without the verification information, a user is not allowed or is prevented from accessing the signature.

A signature may be generated by the user using the graphical user interface presented on the display device (205). In one example, a user may select a tool from a menu that allows him or her to, using a finger or the stylus (235), to sign his or her signature on the display device (205) and securely save the signature on the data storage device (FIG. 1, 120) by associating the signature with a password and/or username. The user may later access the saved signature using the password and/or username or any other authentication method. In one example, the user may be prompted to login to and logout of the MFP device (200). In this example, the login information comprising a username and password automatically allows that user access to the signature without having to provide the username and/or password again. In one example, the signature process may be backed by a service provided by document handling services such as DOCUSIGN. DOCUSIGN is a subscription based document handling service provided by DOCUSIGN which is a San Francisco company that sells electronic signature technology and document transaction management services for facilitating electronic exchanges of electronic documents.

Other examples of secure information items exist and the present specification contemplates the use and securing of those secure information items. In one example, the secure information item may comprise a social security number, a government identification number, the gross income of a user, home address of the user, or any other information a user may wish to protect or maintain as confidential. In other examples, the user may configure the MFP device (200) similar to that above in connection with the user's signature to secure any text or image that is to be secured by the user. Consequently, a user may indicate that any text or image is to be treated as secure and the MFP device (200) would, upon selection of that secure information, request from the user verification information in order to access that secure information. This text or image data so indicated by the user as secure may generally be designated as a secure information item.

When the electronic document is signed, a document transaction management service may indicate that the document was signed by a user. The information will also provide the date and time of the signing as well as the specific name of the user who signed the electronic document. This provides a higher level of security such that a recipient of the signed electronic document may be able to verify via the document transaction management service that the document was signed by the appropriate user. This allows for two or more users to securely conduct business using an electronic document without the need to be physically present to verify that a document was signed by the appropriate user.

Figure 3:
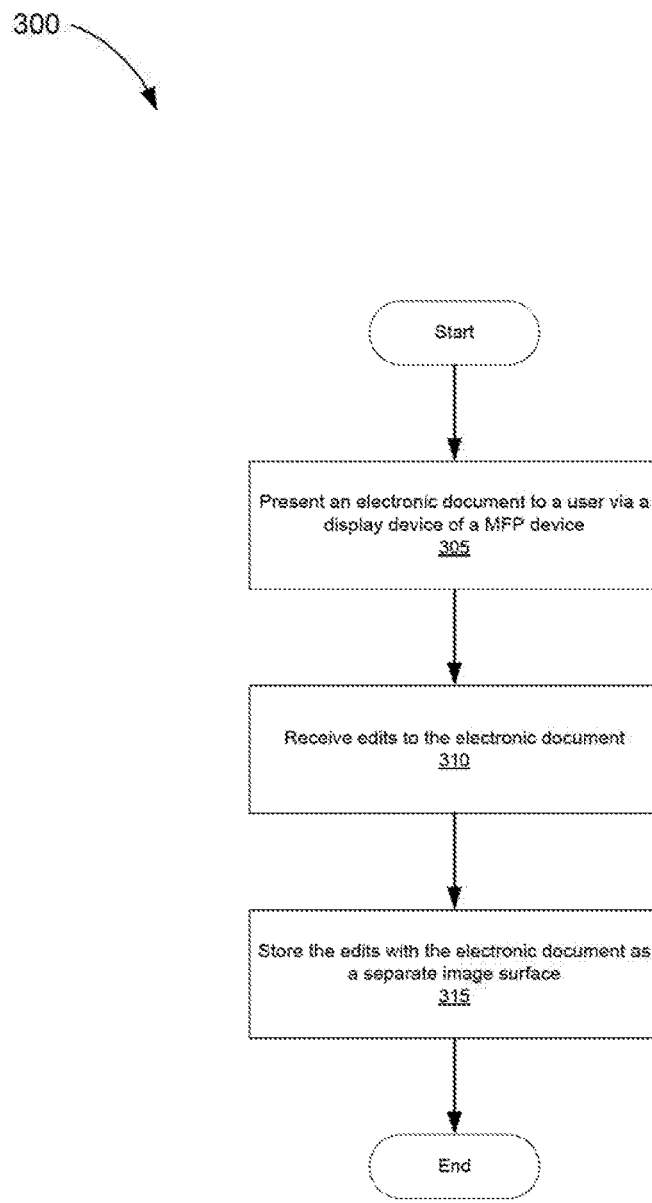
FIG. 3 is a flowchart showing a method of receiving edits, changes, or mark-ups to an electronic document according to one example of the principles described herein.

FIG. 3 is a flowchart showing a method (300) of receiving edits, changes, or mark-ups to an electronic document according to one example of the principles described herein. The method (300) may begin with presenting (305) an electronic document to a user via a display device (FIG. 2, 205) of a MFP device (FIG. 2, 200). As described above, the electronic document may be provided to the MFP device (FIG. 2, 200) by an electronic device (FIG. 1, 110), a previously stored electronic media such as a flash drive, or by a scanner or copier of the MFP device (FIG. 2, 200) itself.

The method may continue with receiving (310) edits to the electronic document. As described above, the edits may be received when the user interacts with the display device (FIG. 2, 205). The display device (FIG. 2, 205) may display individual pages of the electronic document for individual editing or may present to the user a series of thumbnails representing the different pages of the electronic document. The types of edits may vary depending on whether the user is viewing an individual page of the electronic document or viewing a series of thumbnails in a preview mode.

The method may further comprise storing (315) the edits with the electronic document as a separate image surface. Once the edits and electronic document have been saved (315), the user may print a hard copy of the electronic document, fax the electronic document, or email the electronic document to another using the MFP device (FIG. 2, 200).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (115) of the MFP device (105) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a system to edit an electronic document on a multipurpose peripheral device. This system and an accompanying method may have a number of advantages, including the ability of a user to, at a single location, edit and send an electronic document. Content may be generated at the multifunctional peripheral device by the user for use with or for editing of the electronic document. The manipulation of image surfaces allows for a relatively large amount of data without the use of a cloud server or separate server to hold the data and without the need for multiple decompression-render-recompression cycles and other processing which consume system resources. The user may further securely add a signature to the electronic document and verify that that signature has been added to the document with the user's authority. Natural gesture-based movements may be completed by the user to change and alter the content of the electronic document. These gesture-based movements by the user are natural human behaviors when working with a touch input device in familiar and intuitive ways. Even further, the workflow processes associated with producing and signing a document is changed by relieving the user from having to first produce a hard copy of the electronic document, signing it, and potentially scanning that document before sending it electronically to another user.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system comprising:
   a multifunctional peripheral device comprising:
     a processor; and
     a display device;
   in which the display device presents to a user an electronic document;
   in which, with an editing module, the multifunctional peripheral device receives input indicating edits to be made to the electronic document; and
   in which the edits are saved as an electronically separate image surface that is viewable as a thumbnail on the display device as a preview, and the electronically separate image surface is different from an image surface of the electronic document, wherein the electronic document remains unchanged when the image surface with edits is placed over the image surface of the electronic document for printing.

2. The system of claim 1, in which the multifunctional peripheral device receives the electronic document from an electronic device communicatively coupled to the multifunctional peripheral device.

3. The system of claim 1, in which the multifunctional peripheral device receives the electronic document from a scanner of the multifunctional peripheral device.

4. The system of claim 1, in which the electronic document comprises a first image surface apart from the separate image surface comprising the edits to the electronic document, and in which all image surfaces are combined before the electronic document is printed.

5. The system of claim 1, in which the multifunctional peripheral device securely stores a signature on a data storage device communicatively coupled to the multifunctional peripheral device and in which the signature is accessed after the user is authenticated.

6. The system of claim 1, in which the display device is a multi-touch display device that receives input at a plurality of locations on the display device.

7. The system of claim 1, in which the multifunctional peripheral device receives input at the display device indicative of a gesture based manipulation of content displayed in the electronic document.

8. The system of claim 1, in which receiving input at the display device indicative of a gesture-based manipulation of content comprises a cut operation, a copy operation, a text editing option, an image editing option, a text selection operation, an image selection operation, a selection manipulation option, a page orientation operation, or combinations thereof.

9. A method of receiving edits to an electronic document, comprising:
   presenting an electronic document to a user via a display device of a multifunctional peripheral device;
   receiving edits to the electronic document; and
   storing the edits with the electronic document as an electronically separate image surface that is viewable as a thumbnail on the display device as a preview, and the electronically separate image surface is different from an image surface of the electronic document, wherein the electronic document remains unchanged when the image surface with edits is placed over the image surface of the electronic document for printing.

10. The method of claim 9, in which the edits received comprise a secure information item and in which the secure information item is accessed for insertion into the electronic document by input of verifying information.

11. The method of claim 9, in which the multifunctional peripheral device receives the electronic document from a scanner of the multifunctional peripheral device.

12. The method of claim 9, further comprising receiving input at the display device indicative of a gesture-based manipulation of content displayed in the electronic document.

13. The method of claim 9, comprising:
   securely storing a signature in a data storage;
   after storing the signature, receiving verification information to authenticate the user; and
   after authenticating the user, inserting the signature into the electronic document.

14. A computer program product for receiving edits to an electronic document, the computer program product comprising:

a non-transitory computer readable storage medium comprising computer usable program code embodied therewith, the computer usable program code comprising:
computer usable program code to, when executed by a processor, present an electronic document to a user via a multi-touch display device of a multifunctional peripheral device;
computer usable program code to, when executed by a processor, receive edits to the electronic document; and
computer usable program code to, when executed by a processor, store the edits with the electronic document as an electronically separate image surface that is viewable as a thumbnail on the multi-touch display device as a preview, and the electronically separate image surface is different from the image surface of the electronic document, wherein the electronic document remains unchanged when the image surface with edits is placed over the image surface of the electronic document for printing.

15. The computer program product of claim 14, wherein the computer usable code comprises:
computer usable program code to, when executed by a processor,
securely store a signature in a data storage;
after storing the signature, receive verification information to authenticate the user;
after authenticating the user, insert the signature into the electronic document.

16. The computer program product of claim 14, further comprising computer useable program code to, when executed by a processor, receive input at the multi-touch display device indicative of a gesture-based manipulation of content displayed in the electronic document.

* * * * *

UNITED STATES PATENT AND TRADEMARK OFFICE
CERTIFICATE OF CORRECTION

| | | |
|---|---|---|
| PATENT NO. | : 9,942,426 B2 | Page 1 of 1 |
| APPLICATION NO. | : 15/307164 | |
| DATED | : April 10, 2018 | |
| INVENTOR(S) | : Perry V Lea et al. | |

It is certified that error appears in the above-identified patent and that said Letters Patent is hereby corrected as shown below:

On the Title Page

Item (72), Inventors, in Column 1, Lines 4-5, delete "John D Wilcox" and insert -- John D Wilcox, Jr., --, therefor.

Signed and Sealed this
Fourth Day of February, 2020

Andrei Iancu
*Director of the United States Patent and Trademark Office*